United States Patent
Chen (10) Patent No.: US 8,964,714 B2
(45) Date of Patent: *Feb. 24, 2015

(54) TELECOMMUNICATIONS SYSTEM AND METHOD

(71) Applicant: Orange, Paris (FR)

(72) Inventor: Xiaobao Chen, Bath (GB)

(73) Assignee: Orange, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/022,886

(22) Filed: Sep. 10, 2013

(65) Prior Publication Data

US 2014/0071972 A1 Mar. 13, 2014

Related U.S. Application Data

(63) Continuation of application No. 12/933,409, filed as application No. PCT/EP2009/053128 on Mar. 17, 2009, now Pat. No. 8,532,076.

(51) Int. Cl.
| | |
|---|---|
| *H04W 8/04* | (2009.01) |
| *H04W 76/02* | (2009.01) |
| *H04W 8/08* | (2009.01) |
| H04W 36/14 | (2009.01) |
| H04W 80/04 | (2009.01) |

(52) U.S. Cl.
CPC ............... *H04W 76/02* (2013.01); *H04W 8/04* (2013.01); *H04W 8/087* (2013.01); *H04W 36/14* (2013.01); *H04W 80/04* (2013.01)
USPC .......................................................... 370/338

(58) Field of Classification Search
None
See application file for complete search history.

(56) References Cited

U.S. PATENT DOCUMENTS

| | | |
|---|---|---|
| 2004/0109472 A1 | 6/2004 | Choyi et al. |
| 2006/0166699 A1 | 7/2006 | Aghvami et al. |
| 2006/0203787 A1 | 9/2006 | Grech et al. |
| 2007/0297378 A1 | 12/2007 | Poyhonen et al. |
| 2008/0056308 A1 | 3/2008 | Zumsteg |
| 2008/0095119 A1 | 4/2008 | Bachmann et al. |
| 2008/0175181 A1 | 7/2008 | Kakumaru et al. |
| 2008/0299945 A1 | 12/2008 | Kuo et al. |
| 2009/0080441 A1 | 3/2009 | Krishnan et al. |
| 2010/0226310 A1 | 9/2010 | Kuparinen et al. |

OTHER PUBLICATIONS

Joo-Chul Lee et al: "The Design of Mobile Router supporting Heterogeneous Access Networks and IPv4 traversal", Advanced Communication Technology, the 9th International Conference on, IEEE, PI, Feb. 1, 2007, pp. 908-913, XP031084927.

*Primary Examiner* — John Blanton
(74) *Attorney, Agent, or Firm* — David D. Brush; Westman, Champlin & Koehler P.A.

(57) ABSTRACT

A telecommunications system communicates data packets to and from a mobile terminal in accordance with a mobile internet protocol. The system includes a packet radio network having a first radio access interface and a gateway support node and includes a wireless access network having a second radio access interface and a home agent. The mobile terminal is arranged to connect to one of the packet radio network or the wireless access network and, when connected, to detect which of the packet radio network and the wireless access network the mobile terminal has connected. Upon detection that the mobile terminal is attached to the packet radio network, the mobile terminal and the home agent are arranged so that data packets are transmitted to and from the mobile terminal via the gateway support node in preference to the home agent.

10 Claims, 5 Drawing Sheets

TELECOMMUNICATIONS SYSTEM AND METHOD

This Application is a Continuation of U.S. patent application Ser. No. 12/933,409, filed Sep. 17, 2010 which is a Section 371 National Stage Application of International Application No. PCT/EP2009/053128, filed Mar. 17, 2009, and published as WO 2009/115511 on Sep. 24, 2009, in English, all of which are incorporated by reference in their entirety.

FIELD OF THE INVENTION

The present invention relates to mobile telecommunications systems for and methods of communicating data packets to and from a mobile terminal in accordance with a mobile internet protocol.

BACKGROUND OF THE INVENTION

There are many radio access technologies which enable a mobile terminal to communicate packet data to and from data networks. Such technologies include radio access interfaces based on the IEEE 802.11 standard for WLAN (Wireless Local Area Network) and the 3GPP defined General Packet Radio Service (GPRS). A mobile terminal communicates data to and from a data network, for example the internet, via a WLAN by establishing a radio link with a nearby WLAN access point. Typically, a WLAN router connected to the access point will provide the mobile terminal with a temporary internet protocol (IP) address which can then be used by the mobile terminal as an address from which to transmit and receive packet data to and from the network. Similarly, in order for a mobile terminal to communicate data to and from a GPRS data network, for example the internet, the mobile terminal establishes a radio connection via a nearby base station with the core network of a mobile services provider. In order for the mobile terminal to communicate packet data with an external network a GGSN (GPRS Gateway Support Node) present within the core network allocates the mobile terminal a temporary IP address. The GGSN then acts as a gateway between the external network and mobile terminal: the GGSN forwards packets transmitted from the mobile terminal on to their destination on the external network and receives packets addressed to the temporary IP address allocated to the mobile terminal and forwards these received packets to the mobile terminal.

In addition to the various radio technologies that enable a mobile terminal to communicate packet data, a number of mobile IP protocols have been defined. These mobile IP protocols include functionality to enable a user to maintain a secure active IP session on a network whilst moving across access networks. This is achieved principally by employing an IP tunnel in which packets are "tunnelled" from one node to another.

Given the variation between different radio access technologies and the complexity inherent in mobile IP protocols, it is difficult to provide a system which allows a mobile terminal to move between networks accessed through different radio access technologies and using a mobile IP protocol, whilst maintaining efficient communication of packet data.

SUMMARY OF THE INVENTION

According to the present invention there is provided a mobile telecommunications system for communicating data packets to and from a mobile terminal in accordance with a mobile internet protocol. The system comprises a packet radio network including a first radio access interface and a gateway support node. The packet radio network is operable to communicate data packets to and from the mobile terminal, through the gateway support node and via the first radio access interface. The gateway support node is operable to provide a home address via which a correspondent node may transmit data packets via the gateway support node to the mobile terminal when the mobile terminal is attached to the packet radio network. The system further comprises a wireless access network including a second radio access interface and a home agent, the wireless access network being operable to communicate data packets to and from the mobile terminal through the home agent via the second radio access interface, the wireless network being operable to provide a care of address and/or a tunnel or tunnels for the mobile terminal, via which the correspondent node may transmit data packets via the home agent to the mobile terminal when the mobile terminal is attached to the wireless access network. The mobile terminal is further arranged to connect to one of the packet radio network or the wireless access network and, when connected, to detect which of the packet radio network or the wireless access network the mobile terminal has connected. Upon detection that the mobile terminal is attached to the packet radio network, the mobile terminal and the home agent are arranged so that data packets are transmitted to and from the mobile terminal via the gateway support node in preference to the home agent to avoid the tunnelling from HA.

The 3GPP technical specification TS 23.234 defines an I-WLAN (Inter-working WLAN) which integrates elements of conventional 3GPP systems, such as billing, provisioning and security, with a conventional WLAN. It would be desirable to support the handover of a mobile terminal between a GPRS network and an I-WLAN network. A proposed solution to enable this handover to be supported involves employing a mobile IP protocol such as DSMIPv6 (Dual-Stack Mobile IPv6) to support the mobility of the mobile terminal between the GPRS access link and the I-WLAN access link. Conventionally, in systems arranged to communicate in accordance with DSMIPv6, a mobile terminal is allocated a "Home Address" which is used by applications running on the mobile terminal. Such applications may include email clients, VoIP (Voice over IP) clients and web browsing application. When the mobile terminal moves from one access point to another (target) access point, a CoA (Care-of-Address) is allocated by the target access point as a temporary IP address for a mobile terminal to use to access the target link (the target link is sometimes referred to as the foreign network). To reduce any interruption in the flow of data packets being communicated to and from the applications running on the mobile terminal, packet data traffic to the mobile terminal is tunnelled via the Home Agent to the CoA that has been allocated to the mobile terminal. The mobile terminal then de-capsulates the packets and sends the original, decapsulated packets to the application as if the mobile terminal was still attached to its original home link. The home link is the Home IP address and is allocated when application starts running.

However, employing a Mobile IP protocol such as DSMIPv6 to enable the handover from a GPRS link to an I-WLAN link has a number of drawbacks. In particular a number of features associated with DSMIPv6, such as control signalling (e.g. security association set-up) and traffic tunnelling, will remain active when the mobile terminal is connected to the GPRS link and thus increase the signalling overhead. This is undesirable because, although a WLAN link may be capable of providing a connection to a mobile terminal with a bandwidth of several Mbit/s, a GPRS link can be restrained by radio link bandwidth. Therefore, any increase in signalling overhead experienced on a GPRS link may substantially decrease the bandwidth available for applications running on the mobile terminal to transmit and receive data. The reduction in bandwidth may be such that applications requiring minimal transmission delays at relatively high data rates such as VoIP maybe unable to function at all. Therefore embodiments of the present invention enable a mobile terminal to avoid or suppress mobile IP specific operations when the mobile terminal is attached to a GPRS link as a result of an initial attach or handover from an I-WLAN link.

In particular, by ensuring that data packets are transmitted to and from the mobile terminal via the gateway support node in preference to the home agent, any tunnelling and signalling overhead that would have otherwise occurred when the home agent established a connection with the mobile terminal is reduced, or not incurred at all.

In one embodiment of the invention, upon a change in connection by the mobile terminal from the packet radio data access system, for example GPRS, to the wireless packet data access system, for example I-WLAN, the gateway support node in the GPRS network is arranged to forward received packet data addressed to the home agent which tunnels the packets to the care of address.

In this example embodiment of the invention, the mobile terminal is able to handover from the GPRS link to the I-WLAN link whilst maintaining any active applications running on the mobile terminal, by forwarding any incoming packets received at the GGSN to the home agent. The GGSN effectively acts as a relay between the home agent and any external packet network. This is of particular advantage because, although the mobile terminal is no longer on the GPRS link, billing and policy control functions present in the GPRS network can still exert control over the flow of packets to and from the home agent and the mobile terminal, via the GGSN.

In another embodiment of the invention, the gateway support node is arranged to forward received packet data addressed to the home address to the care of address by using a proxy address resolution process. In accordance with the proxy address resolution process, the gateway support node sends an address resolution process request to the home agent and in response, the home agent sends an address resolution response to the gateway support node. The use of an address resolution process to facilitate the forwarding of packets from the GGSN to the home agent is particularly advantageous as it re-uses existing network functionality (i.e. address resolution) to solve the problem. This will reduce the likelihood of encountering compatibility issues when deploying systems arranged in accordance with the present invention and saves the effort and inconvenience of defining a new forwarding mechanism.

Various further aspects and features of the invention are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF EXAMPLE EMBODIMENTS

Figure 1:
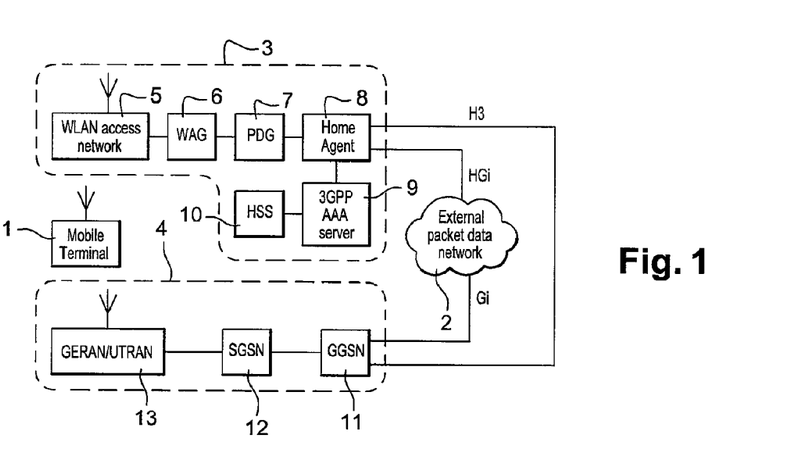
FIG. 1 provides a schematic diagram of a system arranged in accordance with an embodiment of the present invention.

FIG. 1 shows a telecommunications system arranged in accordance with an embodiment of the present invention. The system includes a mobile terminal 1 which includes a mobile IP compatible protocol stack such as a DSMIPv6 protocol stack. The mobile terminal 1 can communicate packet data to and from the I-WLAN network 3 and GPRS network 4. The I-WLAN network 3 includes a WLAN access network for establishing an I-WLAN link with the mobile terminal 1, a wireless access gateway 6 and a packet data gateway 7. The packet data gateway 7 is connected to a home agent 8 which also includes a connection to a 3GPP AAA (Authentication, Authorisation and Accounting) server 9 and a home subscriber server 10. The AAA server 9 and the HSS 10 provide the I-WLAN with 3GPP compatible systems for authentication, billing and security. The GPRS network 4 includes a GERAN/UTRAN (GPRS Edge Radio Access Network/UMTS Terrestrial Radio Access Network) access network 13 for establishing a GPRS link with the mobile terminal 1, and is connected to a SGSN (Serving GPRS Support Node) 12 and a GGSN (Gateway GPRS Support Node) 11. The GGSN 11 is connected to an external packet data network 2, such as the internet via a Gi interface. The home agent 8 is connected to the external packet data network 2 by a HGi interface. The GGSN 11 and the Home Agent 8 are connected on an H3 interface.

Embodiments of the present invention enable a mobile terminal to avoid or suppress mobile IP, such as DSMIPv6, specific operations on a GPRS link as a result of an initial attach or handover from an I-WLAN link. In order for this to occur, the following takes place:

Firstly, upon activation or handover to the GPRS network, the mobile terminal establishes a radio connection and thus a GPRS link with the GPRS access network. After this initial GPRS attach, the mobile terminal is allocated an IP address by the GPRS network.

Secondly, mechanisms must be employed to establish whether or not the mobile terminal is connected to a GPRS access network or not. Although the mobile terminal may be attached to the GPRS network at this point, there may not be any functionality, at the application layer of the mobile terminal at least, that enables the mobile terminal to differentiate between an I-WLAN link and a GPRS link.

Thirdly, if it is determined that the mobile terminal is attached to a GPRS access network, steps must be taken to avoid or suppress the DSMIPv6 specific operations. These steps are explained in further detail below:

IP Address Allocation

When the mobile terminal 1 initially attaches to the GPRS access network 4 and begins an application that requires packet data to be communicated, it is allocated an IP address. Broadly speaking, this can be achieved in one of two ways:

Static Configuration

In a static configuration the mobile terminal 1 is permanently allocated an IP address.

Dynamic Configuration

In a dynamic configuration the mobile terminal 1 is allocated an IP address by the GPRS Network 4 (by the GGSN 11 or via the GGSN 11 by DHCP server (not shown in FIG. 1)). For the dynamic configuration, the IP address is allocated as a result of a (primary) PDP Context Activation. The PDP Context Activation will not be described further here but is fully defined in the 3GPP Technical Standard TS23.060.

For the purposes of this description, the GPRS link, i.e. the link established by the mobile terminal 1 with the GPRS network 4 is defined as the home link of mobile terminal 1 and as such, no DSMIPv6 operations should be necessary on mobile terminal's home link.

Home Link Detection

As mentioned above, the mobile terminal 1 must determine whether or not it is attached to its home link. This may be achieved by adopting any one of the following mechanisms:

GPRS Attach-Based Mechanism

Using the GPRS Attach-based mechanism, the mobile terminal 1 always assumes that the GPRS access network 13 is available or the mobile terminal 1 should, by configuration, always connect initially to a GPRS link. In the latter case, the mobile terminal 1 performs a GPRS Attach (including both A/Gb mode for GERAN and Iu mode for UTRAN) when the mobile terminal 1 powers on and thus enables the mobile terminal 1 to gain access to the GPRS link. The GPRS attach procedure is further defined in 3GPP Technical Specification TS23.060 Section 6.5. As will be understood, during the attach procedure, the mobile terminal 1 provides its identity and an indication of which type of attach that is to be executed. The identity provided to the network may for example be the mobile terminal's Packet Temporary Mobile Subscriber Identity (PTMSI) or International Mobile Subscriber Identity (IMSI). The PTMSI and the RAI associated with the PTMSI will typically be provided if the mobile terminal 1 has a valid PTMSI. If the mobile terminal 1 does not have a valid P TMSI, the mobile terminal can provide its IMSI.

A successful GPRS Attach (including both A/Gb mode and Iu mode) indicates the existence of a GPRS link as the home link. At this point the mobile terminal 1 will be in the Packet Mobility Management Connected (PMM-Connected) state. The mobile terminal 1 may either already have an allocated IP address (static configuration as described above) or need to acquire an IP address through PDP Context Activation (dynamic configuration as described above). Either way, a failed GPRS Attach indicates that GPRS link is unavailable and the mobile terminal can thus determine that it is not attached to its home link.

RAT Identification Mechanism

In accordance with the Radio Access Technology (RAT) identification mechanism, both radio access networks, GPRS and I-WLAN, are allocated a RAT identification code. These codes are stored in each network, for example in the GPRS network they may be stored in the SGSN 12 or the GGSN 11, and in the I-WLAN network they may be stored in the PDG 7. The following are examples of potential RAT identification codes:

GPRS Link Type: RAT ID=0001010
I-WLAN Link Type: RAT ID=0000101

In one embodiment, when the mobile terminal 1 powers on, it does not perform a GPRS Attach, but waits to receive the broadcast signals from either the GPRS or I-WLAN network which periodically transmit the available RAT identification codes to the mobile terminal 1. As soon as the mobile terminal 1 receives the RAT identification codes, it checks, for example, if the RAT identification code=0001010. If this is the case, the mobile terminal 1 "discovers" the existence of GPRS home link and performs a GPRS Attach.

In some embodiments, the mobile terminal 1 may choose to connect to the I_WLAN link (for example manual network selection). As a result, the mobile terminal 1 connects to a foreign link, i.e. the I-WLAN link.

DSIPv6 Tunnelling and Signalling Suppression

When the mobile terminal 1 has determined that it is connected to a GPRS link, the various features and functions of DSMIPv6 need to be deactivated or suppressed. The following actions and/or configurations can be adopted to avoid or minimise the DSMIPv6 signalling overhead, security and tunnelling of IP-in-IP traffic associated with DSMIPv6

Deactivation of DSMIPv6 Bootstrapping

A DSMIPv6 mobile terminal will typically be provided with a software module that runs a "bootstrapping" process (see for example IETF RFC 4640). The bootstrapping process begins when the mobile terminal 1 is activated. Amongst other things, the bootstrapping process causes the mobile terminal 1 to set up security associations and then transmit a binding update (otherwise known as a H1 PDN Attach request) to its home agent 8. Conventionally, the transmitting of the binding update from the mobile terminal 1 is the first step in establishing a mobile IP connection between the mobile terminal 1 and its home agent 8 and the subsequent setting up of all the associated packet tunnelling, security and signalling overhead.

Thus, in order to suppress the establishment of a complete DSMIPv6 connection, the mobile terminal 1 can be adapted so as to completely deactivate the bootstrapping process. Therefore, whenever a GPRS link is discovered, DSMIPv6 bootstrapping is inactivated by the mobile terminal 1. As will be understood, this is the case even if the mobile terminal 1 is provided with an I-WLAN APN (Access Point Name).

Self-Looping the DSMIPv6 Bootstrapping Process

Rather than completely deactivate the DSMIPv6 bootstrapping process, the bootstrapping process can be activated but code defining the bootstrapping process which is stored within the mobile terminal 1 is "self-looped" so that the point at which the bootstrapping process causes the mobile terminal to transmit a binding update/H1 PDN Attach request is never reached.

Active DSMIPv6 Bootstrapping Process

Figure 2:
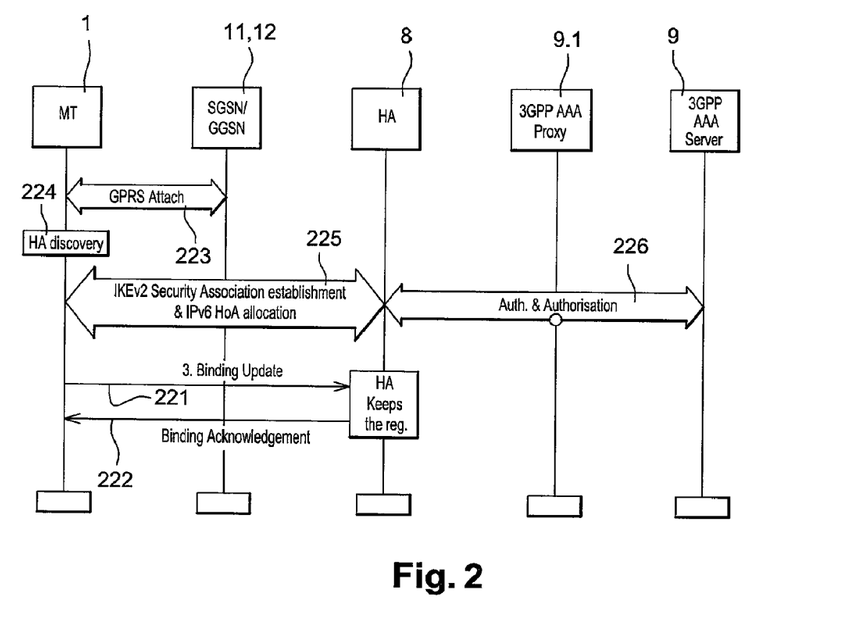
FIG. 2 provides a schematic diagram indicating the flow of messages during a GPRS Home Link Operation and a subsequent binding update.

FIG. 2 shows an embodiment in which the DSMIPv6 bootstrapping remains activated and therefore the mobile terminal 1 does send a binding update/H1 PDN Attach request to the home agent 8. However, the home agent 8 is adapted so that when the binding update is received no further actions are performed by the home agent 8 which would otherwise establish a connection between the home agent 8 and the mobile terminal 1. Therefore the home agent 8 is prevented from tunnelling packets to the GGSN 11 via the home agent 8 whilst the mobile terminal 1 is connected on the GPRS link. This remains the case until, for example, the home agent 8 receives a further binding update from the I-WLAN network 5 indicating that the mobile terminal 1 has left the GPRS link.

Upon receiving the binding update/H1 PDN Attach request from the mobile terminal 1, the home agent 8 may keep the binding update/H1 PDN Attach request registration live by performing the necessary binding update operations whilst disables the tunnelling operations. This has the advantage of providing the mobile terminal with pre-hand over status prepared and can lead to the reduction of hand over latency if the mobile terminal moves from the GPRS link to the I-WLAN link.

The result of the operations, set out above, is that, because a binding update/H1 PDN Attach is never sent to the home agent 8 or does not trigger tunnelling operations at the home agent 8, the GGSN 11 remains as the mobile terminal's gateway to external packet data networks. Therefore the GGSN 11 will receive IP packets on the Gi interface from external packet data networks without requiring that packets be tunnelled through to the home agent 8 and therefore incurring the additional tunnelling, security and signalling overhead associated with DSMIPv6.

Handover from GPRS to I-WLAN

In some embodiments of the present invention, functionality is provided which enables a mobile terminal 1, having established a connection with a GPRS network 4 as described above, to hand over to the I-WLAN network 3.

In various circumstances, the mobile terminal 1 may need to perform a handover from the GPRS network 4 to the I-WLAN network 3. This may be triggered for example, by the mobile terminal 1 choosing to connect to the I-WLAN network, the mobile terminal receiving instructions to connect to the I-WLAN network, or the GPRS signal strength dropping below a threshold value. If a handover is to be performed, the mobile terminal 1 must acquire a care of address from the I-WLAN 3.

As will be appreciated, when the mobile terminal 1 is seeking to handover from the GPRS network 4 to the I-WLAN network 3, there are two potential IP addresses that can be associated with the mobile terminal 1: the home IP address used by mobile terminal 1 when it is on its home link (GPRS), and the care of address which will be allocated to the mobile terminal 1 by the I-WLAN network 3 when the handover has been completed. As shown in FIG. 2, when the mobile terminal 1 moves to I-WLAN coverage or connects to a I-WLAN link, it performs a binding update/H1 PDN Attach 221, 222 with the home agent 8 following GPRS attach 223, home agent discovery 224 and security association 225 and authentication and authorisation 226.

In order to facilitate the handover, the home agent 8 is adapted to associate the home IP address (i.e. the address initially allocated by the GPRS network to the mobile terminal 1) with the care of address allocated by the I-WLAN network 3 to the mobile terminal 1. However, the home agent 8 needs to be able to "intercept" packets sent to mobile terminal's home IP address and encapsulate them with the mobile terminal's care of address as a destination address and the home agent's own address as the source address in the encapsulation IP header. Thus, when the packets arrive at the mobile terminal 1, it can de-capsulate the packets and receive the inner packet with the home IP address as the destination address and then deliver the inner packet to the relevant application running on the mobile terminal 1. However, because the mobile terminal 1 was originally attached to the GPRS network 4, as far as external nodes are concerned, the mobile terminal's IP address is the address established when the mobile terminal 1 was activated and which was provided by the GGSN 11 (i.e. the home IP address). Therefore, even after handover to the I-WLAN network 3, packets received from the external packet data network 2, will be addressed to the home IP address maintained by the GGSN 11. In order to facilitate a handover, it must be ensured that the home agent 8 receives packets addressed to the mobile terminal 1 despite the fact that those packets are otherwise sent to GGSN 11. Furthermore, the GGSN 11 must be adapted so that it does not attempt to relay packets it receives back to the mobile terminal via GTP tunnels.

The following mechanisms allow the mobile terminal to hand over from the GPRS network to the I-WLAN network whilst overcoming the problems set out above:

GGSN Relay to Home Agent via H3 interface by activating "HA-Aware Operations in GGSN"

Figure 3:
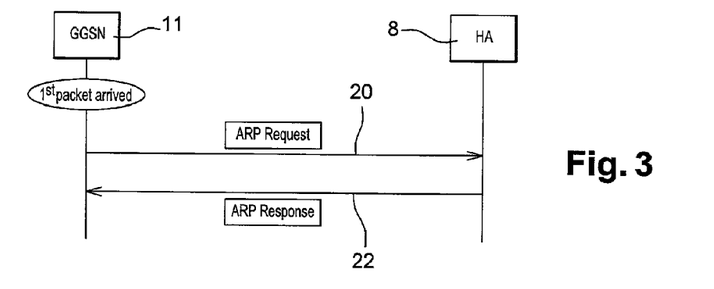
FIG. 3 provides a schematic diagram indicating the flow of messages during home agent-aware GGSN operations using an address resolution procedure.

As shown in FIG. 3, upon a successful binding update from the mobile terminal 1 which indicates the use of RAT-ID=I-WLAN (0000101), the GGSN 11 and the home agent 8 uses a proxy ARP (Address Resolution Protocol) to enable the home agent to intercept packets sent to mobile terminal's GPRS Link (home network).

In order to achieve this the GGSN 11 and the home agent exchange ARP (Adress Resolution Protocol) messages 20, 22 on the H3 interface shown in FIG. 1.

The ARP Request 20 sent from the GGSN 11 comprises the following format:

Sender's Layer 2 Address: GGSN Layer 2 address;
Sender's IP Address: GGSN IP Address;
Target's IP Address: MN's Home Address:
Target's Layer 2 Address: Null (to be filled by home agent for packet interception purpose)

This home agent aware GGSN function is triggered by the mobile terminal's I_WLAN Mobility APN which is sent to the GGSN 11 during the PDP Context Activation or activated by the first incoming downlink IP packet addressed to the mobile terminal 1 arriving at the GGSN 11. To avoid frequent ARP request/response between GGSN 11 and home agent 8, the ARP request can be sent periodically with an interval of less than the expected or achievable handover latency from the GPRS network to the I-WLAN, for example 500 ms.

When the home agent 8 receives the ARP Request 20 from the GGSN 11 for the mobile terminal's Link Layer address to be linked with its Home Address (the address allocated to MN at GPRS link), as described above, the home agent 8 sends an ARP reply 22 with the following format:

Sender' Address: MN Home Address;
Sender's Layer 2 address: Home Agent Link Layer Address
Target's Address: the address of GGSN which sends the ARP request out;
Targets' Layer 2 address: the GGSN's Link Layer Address.

A conventional GGSN will look for a matching GTP tunnel (by using the Traffic Flow template) to forward any incoming IP packets to the relevant mobile terminal. To make sure that GGSN 11 does not do this, the GGSN 11 is adapted so it is aware of the mobility of the mobile terminal 1 by sending ARP requests periodically so that it can receive the ARP reply from the home agent 8 when the mobile terminal 1 has left the GPRS link and connected to the I_WLAN access and is under the control of home agent 8.

Upon receiving the ARP reply from the Home Agent, the GGSN 11 updates its layer 2 cache with mobile terminal's Home IP address mapped to the home agent's Layer 2 address.

Alternatively, the routing table at the GGSN 11 is updated by changing the output interface of that connected to the SGSN 12 to the interface connected to home agent 8. As a result, any incoming packets received by the GGSN 11 will then be forwarded to the home agent 8 using the updated routing table.

GGSN Packet Tunnelling to Home Agent

Figure 4:
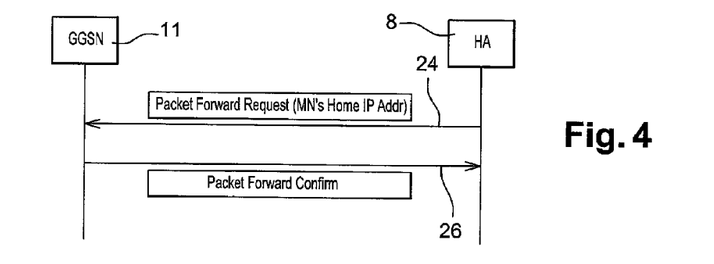
FIG. 4 provides a schematic diagram indicating the flow of messages during home agent-aware GGSN operations using a packet forwarding request.

As shown in FIG. 4, in another embodiment, the GGSN Aware Home Agent Operation can be triggered by the home agent 8 which sends a MN Packet Forwarding Request 24 to the GGSN 11 on H3 interface. Upon receiving the request, the GGSN 11 responds by sending a Packet Forwarding Confirm message 26. The Packet Forwarding Request 24 contains the mobile terminal's Home IP address so that the GGSN 11 will then forward incoming packets addressed to the mobile terminal to the home agent 8 by encapsulation. The packet encapsulation may comprise the following format:

Outer Header: Destination: home agent address, Source: GGSN address
Inner Header: Destination: mobile terminal's home address, Source: Correspondent Node Address The GGSN 11 responds with a packet forward confirm message 26.

In both of the above embodiments, the GGSN 11 acts to forward relay packets between the home agent 8 and the external packet network 2. This may be considered advantageous because, although the mobile terminal 1 is no longer on the GPRS link, billing and policy control functions present in the GPRS network can still exert control over the flow of packets to and from the home agent 8 and the mobile terminal 1, via the GGSN 11.

Home Agent with SGSN Functionality

Figure 5:
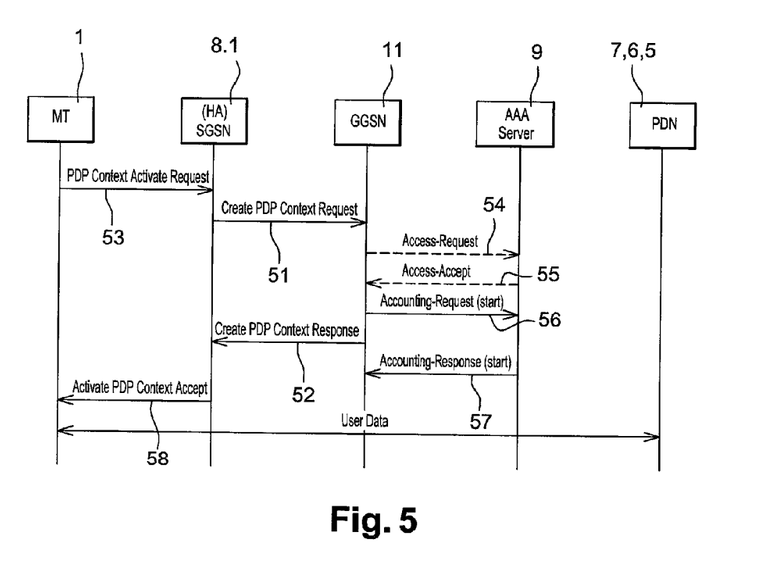
FIG. 5 provides a schematic diagram indicating the flow of messages during the AAA server allocated IP address procedure.

As shown in FIG. 5, in another embodiment, GTP based tunnel can also be used. This is achieved by enabling home agent to function as an SGSN. FIG. 5 illustrates the home agent/SGSN 8.1 exchanging the relevant messages 51,52 with the GGSN 11 to establish a GTP based tunnel. FIG. 5 also illustrates the transmitting of a PDP context request message 53, the exchange of access and accounting messages 54, 55, 56, 57 between the GGSN 11 and the AAA server 9, the transmitting from the home agent 8.1 with SGSN functionality of a PDP context accept message 58.

HGi based Packet Forwarding from the Home Agent

In another embodiment, the GGSN 11 is eliminated from the process and, after the handover, packets are sent to and from the mobile terminal 1 via the home agent 8 on the HGi interface shown in FIG. 1. In order to facilitate this, after the handover has begun, the mobile terminal 1 no longer maintains the GPRS session in question (i.e. the PDP contexts) once it is connected to the I-WLAN Link. Furthermore, following the release by the mobile terminal 1 of the GPRS link or the PDP Context deactivation, the following occurs:

1) Packet transfer on the Gi ceases and the GGSN 11 no longer needs to forward incoming packets to the mobile terminal via the GPRS link or send outgoing packets from the mobile terminal to the external packet data network, and
2) Packet transfer on the HGi interface begins after successful connection binding update operations between the mobile terminal and the home agent over the I-WLAN link. Thus the home agent 8 takes over from the GGSN and forward packets to the mobile terminal via DSMIPv6 tunnelling.

Home IP Address Preservation

Figure 6:
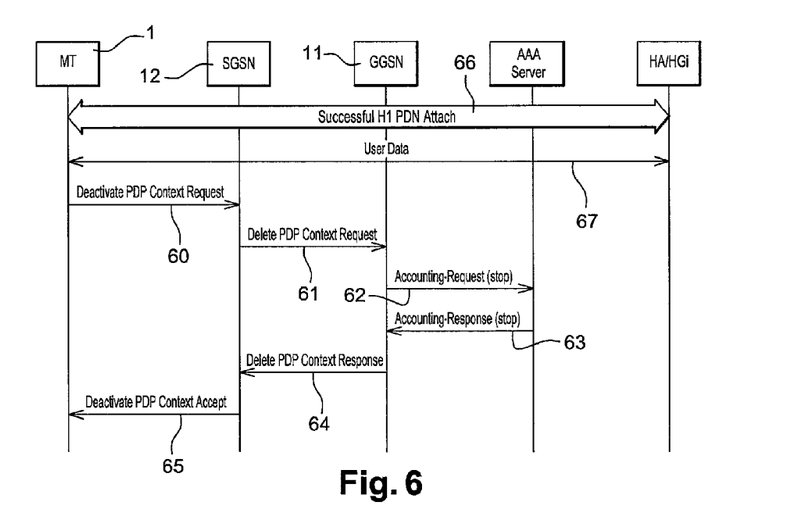
FIG. 6 provides a schematic diagram indicating the flow of messages during a procedure in which the AAA server preserves the home IP address when the mobile terminal initiates the PDP context deactivation.

As will be understood, it is necessary to preserve the IP address allocation after the deactivation of PDP Contexts to maintain the mobile terminal's on-going applications. Therefore the deactivation of PDP contexts must occur in such a way that they do not release the mobile terminal's home IP address allocated by the GGSN 11 when the mobile terminal 1 was connected to the GPRS link. Otherwise, the released IP address can be allocated to another mobile terminal which initiates PDP Context Activation. This may cause IP address duplications and faults in operations. To achieve this, the mobile terminal's address allocation should be independent from GGSN 11, i.e. the home IP address should be allocated externally by a DHCP or a (3GPP) AAA server. In other words, the IP address allocated to the mobile terminal 1 should be preserved when the mobile terminal 1 moves to an I_WLAN network. This is shown in FIG. 6 which illustrates IP address assignment by an AAA server.

To achieve the preservation of the mobile terminal's IP address allocated by the AAA server, when the binding update/H1 PDN Attach takes place, the home agent 8 registers the mobile terminal's home IP address with the AAA server. Therefore the AAA server checks if a PDP Context Deactivation is aligned with the mobile terminal 1 whose address is registered with AAA server by the home agent 8. If this is the case, the AAA server will preserve the IP address for the mobile terminal 1.

The following describes two embodiments which allow the preservation of the mobile terminal's allocated IP address in the context of the present invention:

Mobile Terminal Initiates PDP Context Deactivations but Preserve the Home IP Address Allocated to the Mobile Terminal In this embodiment the mobile terminal initiates the PDP context deactivation. As shown in FIG. 6, following, for example, a successful H1 PDN attach, and the exchange of user data 67, a deactivate PDP context message 60 is sent from the mobile terminal 1. When the GGSN 11 receives a Delete PDP Context Request message (and providing a RADIUS Accounting-Request START message was sent previously), the GGSN 11 sends a RADIUS Accounting-Request STOP message 62 to the AAA server, which indicates the termination of the user session. The GGSN 11 then immediately sends a Delete PDP context response message 64, without waiting for an Accounting-Response STOP message 63 from the AAA server. The AAA server does not de-allocate the IP address or IPv6 prefix (if any) initially allocated to the mobile terminal 11. The SGSN sends a corresponding deactivate PDP context accept message 65 to the mobile terminal 1.

Figure 7:
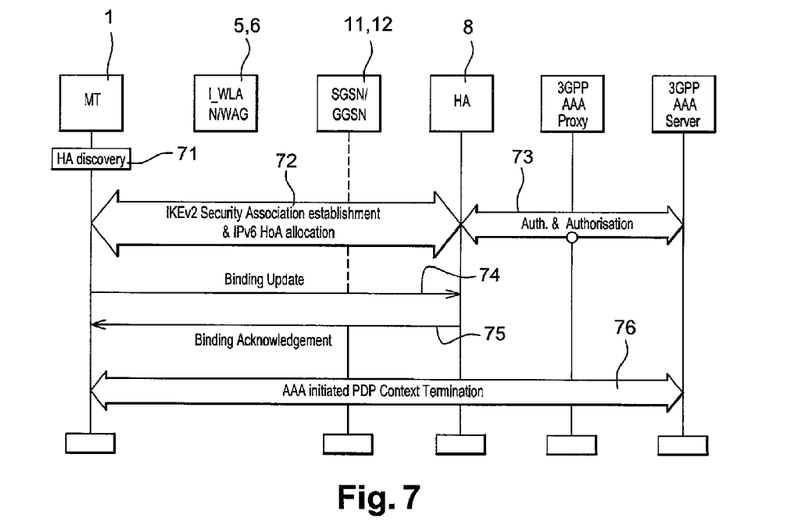
FIG. 7 provides a schematic diagram indicating the flow of messages during a procedure in which the home IP address is preserved when the AAA server initiates the PDP context deactivation.

AAA Server Initiates PDP Context Deactivations but Preserve the Home IP Address Allocated to the Mobile Terminal In this embodiment, the AAA server initiates the PDP context deactivation. FIG. 7 shows a procedure in which, following home agent discovery 71, security association establishment 72, authentication and authorization 73 and a successful binding update 74, 75, the AAA server initiates the PDP context deactivation. The AAA server detects the Home IP address as being used by the mobile terminal by receiving the information from the home agent 8 on the H2 interface between the AAA server and the home agent 8. If the AAA server finds that the mobile terminal's Home IP address as indicated by the home agent 8 matches the IP address that it has allocated to the mobile terminal 1 when the mobile terminal 1 is connected to the GPRS link, it will not release the Home IP address even if the PDP Context is deactivated. It is noted that in FIG. 7, the AAA server initiated PDP context deactivation 76 can be executed in parallel with the binding update 74, 75 or it could be executed after the binding update 75, 75 to make sure that the I-WLAN access/Mobile IP tunnel is successfully installed;

Handover from I-WLAN to GPRS

When the mobile terminal moves back to the GPRS network 4 from the I-WLAN network 3, embodiments of the present invention enable it to register with the home agent 8 and incur no DSMIPv6 signalling or IP-in-IP tunnelling traffic.

Figure 8:
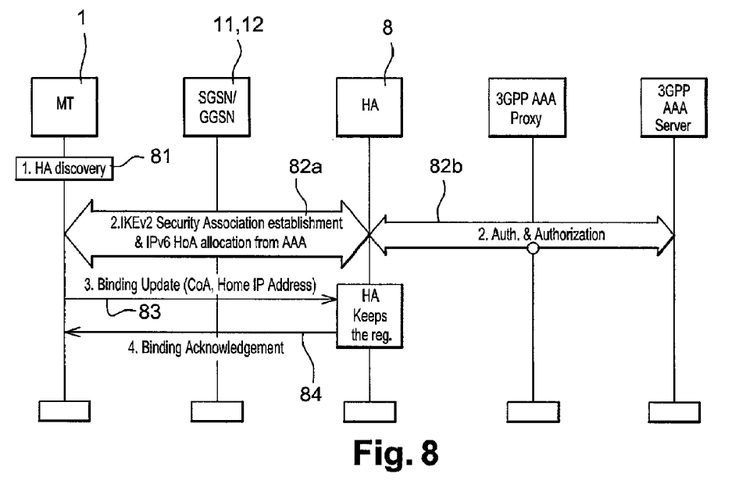
FIG. 8 provides a schematic diagram indicating the flow of messages during a procedure in which the home IP address is allocated by the AAA server when the mobile terminal performs a binding update/H1 PDN Attach.

To achieve this the address allocated to the mobile terminal and used by applications running on the mobile terminal is maintained when the mobile terminal moves back to the GPRS link from the I-WLAN. In other words the mobile terminal is allocated a GPRS home IP address when the mobile terminal is connected to the I-WLAN link. To achieve this the Remote IP address (i.e. the address allocated to the mobile terminal when it is attached to the I-WLAN network) allocated to the mobile terminal is taken to be the mobile terminal's home IP address while the local IP address is the CoA address to be used by the mobile terminal. To achieve this home IP address preservation, external IP address schemes should be used for example allocated by the AAA Server. As shown in FIG. 8, after home agent discovery 81, and security association establishment 82a, the authentication and authorisation message 82b includes a field of a blank IP address to be allocated by the AAA server. Upon successful authentication and authorisation, the home agent 8 receives a suitable IP address (the mobile terminal's Remote IP address being the Home IP Address). The Binding Update procedures continue with a binding update message 83 from the mobile terminal 1, and a binding update acknowledgement 84 from the home agent 8. Upon a successful Binding Update procedure 83, 84, the mobile terminal 1 starts receiving tunnelled IP packets from the home agent 8 with the following outer/inner IP packet headers:

Outer IP Packet Header (Encapsulation Header):
Destination Address: Mobile Terminal's CoA (the I-WLAN allocated Local IP Address):
Source Address: Home Agent's Address:
Inner IP Packet Header:
Destination Address: Mobile Terminal's Home IP Address
Source Address: Mobile Terminal's Correspondent Node IP Address.

Upon receiving the packets, mobile terminal de-encapsulates the packet by removing the outer IP header.

Figure 9:
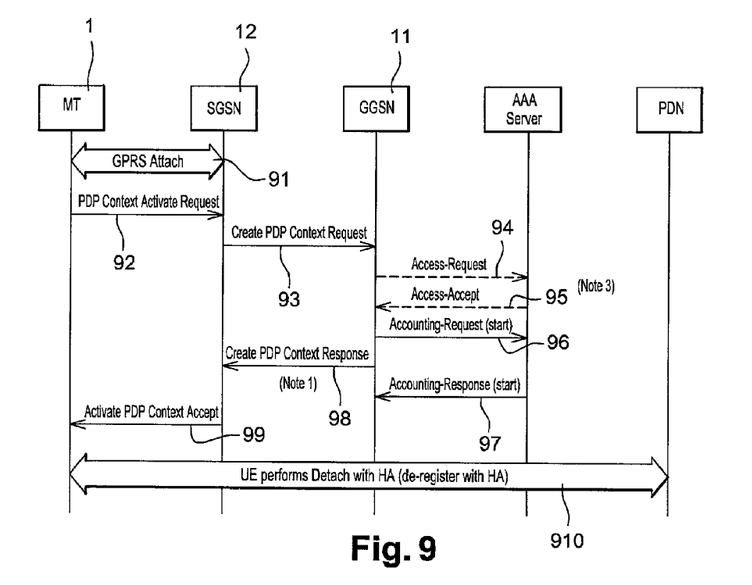
FIG. 9 provides a schematic diagram indicating the flow of messages during a procedure in which the mobile terminal hands over to a GPRS link with the AAA server allocated home IP address preserved.

When the mobile terminal connects to the GPRS link, the mobile terminal performs the procedure shown in FIG. 9 without performing a H1 PDN Attach. As is shown in FIG. 9, the mobile terminal 1 performs a GPRS attach 91 and transmits a PDP context activation request 92 to the SGSN 12. Upon receipt of the PDP request message 92, the SGSN 12 transmits a create PDP context request message 93 to the GGSN 11. Following the exchange of access and accounting messages 94, 95, 96, 97 with the AAA server, the GGSN 11 transmits a create PDP context response message 98 to the SGSN 12, which then transmits an activate PDP context request message 99 to the mobile terminal. The mobile terminal then performs a detach 910 from the home agent 8.

Figure 10:
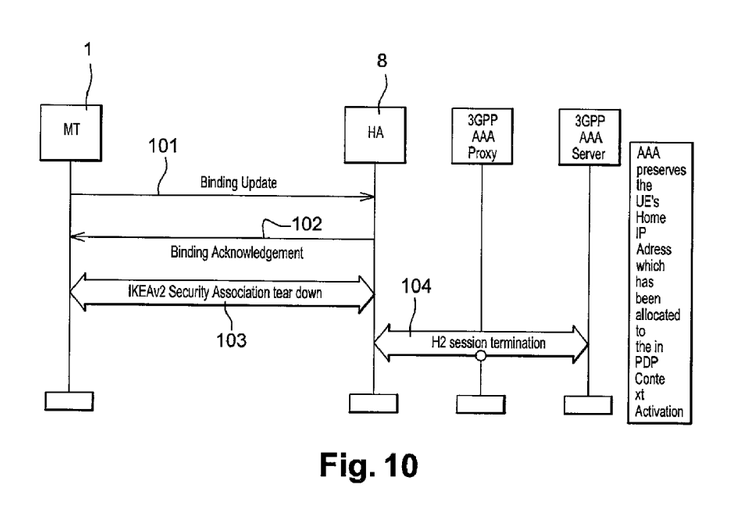
FIG. 10 provides a schematic diagram indicating the flow of messages during a mobile terminal initiated detach procedure.
Figure 11:
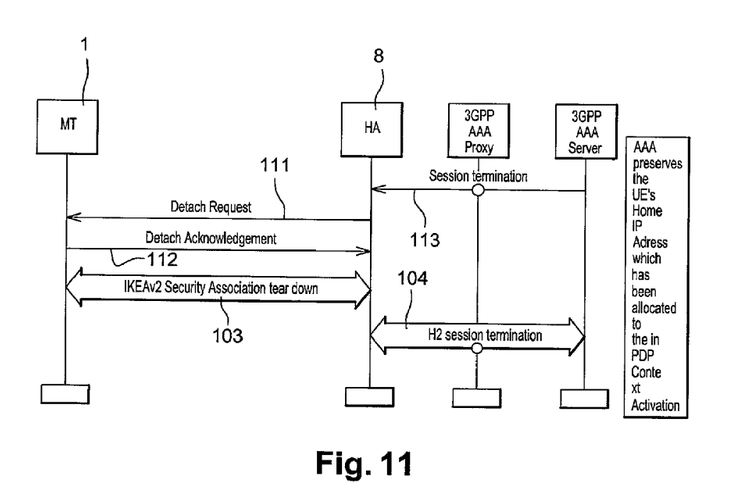
FIG. 11 provides a schematic diagram indicating the flow of messages during an AAA server initiated detach procedure preserving the mobile terminal's home IP address.

FIGS. 10 and 11 show Binding Update Steps defined to be an adapted H1 PDN Detach. In FIG. 10, the mobile terminal 1 transmits a binding update message 101 and receives from the home agent 8 a binding update acknowledgement 102. Following a security association tear down 103 between the mobile terminal 1 and the home agent 8, an H2 session termination 104 occurs between the home agent 8 and the and the AAA server. During the H2 session termination 104, the AAA server preserves the mobile terminal's home IP address which has been used by the mobile terminal as indicated in FIG. 9 during the PDP Context Activation. Following the security association tear down 103 between the mobile terminal 1 and the home agent 8, an H2 session termination 104 occurs between the home agent 8 and the and the AAA server.

Alternatively, as shown in FIG. 11, the AAA server can initiate the Detach Procedure but preserve the mobile terminal's IP Address. In FIG. 11, following a session termination message 113 from the AAA server and a detach request 111 transmitted from the home agent 8 to the mobile terminal 1, the mobile terminal 1 sends a detach acknowledgment 112 message to the home agent 8.

Address Allocation for Handover to WLAN 3GPP IP Access

When using WLAN 3GPP IP Access, a WLAN mobile terminal uses two IP addresses; i.e. its local IP address and remote IP address. In a WLAN 3GPP IP Access enabled system, the local IP address can be assigned by a WLAN or by a PLMN (a VPLMN in roaming case and a HPLMN in non-roaming case). For the WLAN-assigned local IP address, which belongs to the address space of WLAN AN, there is no additional requirement on the WLAN.

When using WLAN 3GPP IP Access, a WLAN mobile terminal's remote IP address identifies the WLAN mobile terminal in the network that the WLAN mobile terminal is accessing for the 3G packet switched service. The remote IP address is used for the inner packet of the WLAN mobile terminal-initiated tunnel. It can be assigned by HPLMN, VPLMN or an external IP network. The remote IP address can be statically or dynamically assigned. The only case where VPLMN assigns the remote IP address for the WLAN mobile terminal is when the WLAN mobile terminal-initiated tunnel terminates at the VPLMN's PDG. When the WLAN mobile terminal's remote IP address is allocated by the external IP network, the PDG is required to have an interface with an address allocation server, such as AAA server or a DHCP server, belonging to the external IP network. For the WLAN mobile terminal's remote IP address, IPv4 addresses will be supported. When the WLAN mobile terminal accesses 3G packet switched based services using an IPv6 network such as an IMS service, IPv6 addresses shall be supported for the WLAN mobile terminal's remote IP address. To avoid any clashes between addresses used in WLAN and PLMN and to enable correct routing of packets sent out by the WLAN mobile terminal, the PLMN operator should allocate public addresses to network nodes, which are addressed by WLAN mobile terminals.

When a WLAN mobile terminal accesses several 3G packet based services with different W-APNs (Wireless Access Point Nodes) simultaneously, the WLAN mobile terminal can obtain several remote IP addresses. There may be several WLAN mobile terminal-initiated tunnels for the services. In this case; the mobile terminal may have three IP Addresses: the home IP address used by mobile terminal at its GPRS link; the local IP address as its care of address, and the remote IP Address to be allocated by the PLMN or external PDN. The remote IP address is not taken to be a care of address for the mobile terminal in I-WLAN because it is used for mobile terminal to access IP services via the 3GPP PLMN e.g. when mobile terminal activates new applications in the I-WLAN coverage, it should use this remote IP address.

Various modifications may be made to the embodiments herein before described. For example, although the present invention has been described largely in terms of DSMIPv6 different types of mobile IP protocols could equally well be employed.

The invention claimed is:

1. A mobile terminal operable to communicate data packets to and from a telecommunications system in accordance with a mobile internet protocol, wherein the system comprises a packet radio network including a first radio access interface and a gateway support node, and a wireless access network including a second radio access interface and a home agent, the mobile terminal being operable to:
communicate data packets to and from the packet radio network through the gateway support node via the first radio access interface when the mobile terminal is attached to the packet radio network, the gateway support node being operable to provide a home address via which a correspondent node may transmit data packets via the gateway support node to the mobile terminal,
communicate data packets to and from the wireless access network through the home agent via the second radio access interface when the mobile terminal is attached to the wireless access network, the wireless access network being operable to provide a care of address for the mobile terminal via which the correspondent node may transmit data packets via the home agent to the mobile terminal wherein the mobile terminal is arranged to connect to one of the packet radio network or a wireless access network and, when connected, to detect which of the packet radio network and the wireless access network the mobile terminal has connected, and upon detection that the mobile terminal is attached to the packet radio network, the mobile terminal and the home agent are arranged so that data packets are transmitted to and from the mobile terminal via the gateway support node and mobile internet protocol operations through the home agent are deactivated or suppressed.

2. The mobile terminal as claimed in claim 1, wherein the mobile terminal determines whether it is attached to its home link for detection of attachment to the packet radio network.

3. The mobile terminal as claimed in claim 1, wherein the mobile terminal is operable to receive an access system identification code broadcast by the packet radio network and, following connection of the mobile terminal to the packet radio network, the mobile terminal is operable to detect that a connection has been made with the packet radio network from the access system identification code.

4. The mobile terminal as claimed in claim 1, wherein the mobile terminal is adapted to de-activate a bootstrapping process which causes the mobile terminal to send a binding update message to the home agent of the wireless access network when the mobile terminal is activated.

5. The mobile terminal as claimed in claim 1, wherein the mobile terminal is adapted such that a bootstrapping process which causes the mobile terminal to send a binding update message to the home agent of the wireless access network is disabled by including within the bootstrapping process a self-loop.

6. The mobile terminal as claimed in claim 1 wherein the mobile terminal includes a bootstrapping process which causes the mobile terminal to send a binding update message to the home agent of the wireless access network, and upon receipt of the binding update message, the home agent is operable to suspend further operations which would otherwise establish an internet protocol tunnel to the mobile terminal via the gateway support node.

7. The mobile terminal as claimed in claim 1, wherein the mobile internet protocol is a dual stack internet protocol.

8. The mobile terminal as claimed in claim 1, wherein the mobile terminal performs a detach from the home agent.

9. A method for communicating data packets to and from a telecommunications system in accordance with a mobile internet protocol, wherein the system comprises a packet radio network including a first radio access interface and a gateway support node and a wireless access network including a second radio access interface and a home agent, the method comprising the following steps carried out by the mobile terminal:
communicating data packets to and from the packet radio network through the gateway support node via the first radio access interface when the mobile terminal is attached to the packet radio network, the gateway support node being operable to provide a home address via which a correspondent node may transmit data packets via the gateway support node to the mobile terminal,
communicating data packets to and from the wireless access network through the home agent via the second radio access interface when the mobile terminal is attached to the wireless access network, the wireless access network being operable to provide a care of address for the mobile terminal via which the correspondent node may transmit data packets via the home agent to the mobile terminal,
connecting to one of the packet radio network or the wireless access network and, when connected, detecting which of the packet radio network and the wireless access network the mobile terminal has connected,
and upon detection that the mobile terminal is attached to the packet radio network, transmitting data packets to and from the mobile terminal via the gateway support node and deactivating or suppressing mobile internet protocol operations through the home agent.

10. A non-transitory computer readable medium comprising a computer program recorded thereon having computer executable instructions, which when loaded on to a computer causes the computer to perform a method for communicating data packets to and from a telecommunications system in accordance with a mobile internet protocol, wherein the system comprises a packet radio network including a first radio access interface and a gateway support node and a wireless access network including a second radio access interface and a home agent, the method comprising communicating data packets to and from the packet radio network through the gateway support node via the first radio access interface when the mobile terminal is attached to the packet radio network, the gateway support node being operable to provide a home address via which a correspondent node may transmit data packets via the gateway support node to the mobile terminal, and communicating data packets to and from the wireless access network through the home agent via the second radio access interface when the mobile terminal is attached to the wireless access network, the wireless access network being operable to provide a care of address for the mobile terminal via which the correspondent node may transmit data packets via the home agent to the mobile terminal, connecting to one of the packet radio network or the wireless access network and, when connected, detecting which of the packet radio network and the wireless access network the mobile terminal has connected, and upon detection that the mobile terminal is attached to the packet radio network, transmitting data packets to and from the mobile terminal via the gateway support node and deactivating or suppressing mobile internet protocol operations through the home agent.

* * * * *